United States Patent Office
3,775,338
Patented Nov. 27, 1973

3,775,338
PROCESS FOR PREPARING A STABLE, HOMOGENEOUS URANIUM DIOXIDE-ZIRCONIUM DIOXIDE BINARY SOL
Benedict L. Vondra, Jr., Greensburg, Thomas E. Haley, Lower Burrell, and Daniel F. Burke, Delmont, Pa., assignors to Atlantic Richfield Company, Glenolden, Pa.
No Drawing. Filed Nov. 13, 1970, Ser. No. 89,437
Int. Cl. G21c 19/42
U.S. Cl. 252—301.1 S
10 Claims

ABSTRACT OF THE DISCLOSURE

Aqueous solutions of uranium and zirconium in their nitrate form are mixed and thereafter denitrated by contacting with an amine to form a stable, homogeneous uranium dioxide-zirconium dioxide binary sol. In one embodiment, aqueous solutions of uranium (VI) nitrate and zirconyl nitrate are mixed and the resultant solution is reduced and thereafter denitrated to form a binary sol. In another embodiment the uranium (VI) nitrate solution is first reduced and then mixed with the zirconyl nitrate solution and thereafter denitrated to form the binary sol.

BACKGROUND OF THE INVENTION

Field of the invention

This invention relates to uranium dioxide-zirconium dioxide binary nitrate sols and is specifically directed to a process for preparing sols which are more stable and homogeneous than hereinbefore produced.

Description of the prior art

Fitch et al., U.S. Pat. 3,331,785 of July 18, 1967, disclose mixing a uranium dioxide sol with a zirconium dioxide sol so as to form a mixed uranium dioxide-zirconium dioxide chloride sol. With the Fitch et al. process it is difficult to reproduceably achieve a homogeneous stable sol due to difficulties in achieving a uniform mixture of the particles comprising the original individual sol, and difficulties in producing two sols. Furthermore, the Fitch et al. process requires forming two separate sols. Another problem is the difficulty in storing the uranium dioxide sol prior to its mixing with the zirconium doxide sol due to its tendency to oxidize.

Morse, U.S. Pat. 3,367,881 of Feb. 6, 1968, shows preparation of uranium containing sols by use of an amine to denitrate an aqueous nitrate solution. This reference fails to show denitration of a binary uranium-zirconium nitrate solution.

Moore, U.S. Pat. 3,335,095, Aug. 8, 1967, shows preparation of a binary urania-thoria sol from a mixture of thorium nitrate and uranium (VI) nitrate by denitration of the binary solution. This reference is not suggestive of a process of preparing binary uranium-zirconium sols which require reduction of the U (VI) to U (IV) before sol formation. It is well known in the art that there are great differences in processes involving thorium in combination with uranium, as opposed to zirconium in combination with uranium.

SUMMARY OF THE INVENTION

It is accordingly one object of our invention to provide an improved method of preparing a stable, homogeneous uranium dioxide-zirconium dioxide sol.

It is another object to provide an improved method of preparing binary urania-zirconia sols of any desired urania-to-zirconia ratio. Other objects will become apparent from the following description and attached claims.

In accordance with our invention we have provided a method of making a binary urania-zirconia sol from an aqueous solution of uranium (VI) nitrate and an aqueous solution of zirconyl nitrate comprising in one embodiment mixing the uranium (VI) nitrate solution with zirconyl nitrate solution in the desired ratio, reducing the resultant mixture so that at least 60 weight percent of the uranium is in the tetravalent state, and thereafter denitrating the reduced mixture with an amine so as to form a binary sol. In a second embodiment, our method comprises reducing at least 60 weight percent of the uranium (VI) nitrate to uranium (IV), thereafter mixing the reduced uranium solution with zirconyl nitrate, and thereafter denitrating the mixture with an amine.

DESCRIPTION OF THE PREFERRED EMBODIMENTS

Binary urania-zirconia sols of any desired urania-zirconia ratio are prepared by contacting a mixture containing uranium (IV) nitrate and zirconyl nitrate with a primary or secondary amine to denitrate the mixture and thereby form a sol.

The solution containing both uranium (IV) nitrate and zirconyl nitrate is prepared either by mixing the uranium (IV) nitrate and zirconyl nitrate in the desired ratio, or by mixing uranium (VI) nitrate with zirconyl nitrate and thereafter reducing the mixture with a reducing gas in the presence of a catalyst.

A particularly preferred method of reducing the aqueous solution containing either uranium (VI) nitrate or a mixture of uranium (VI) nitrate with zirconyl nitrate is to contact it with a reducing gas in the presence of a catalyst insoluble in nitric acid. The reducing gas is most suitably hydrogen.

The catalyst can be platinum, rhodium, iridium, platinum alloys, or palladium alloys. A slurry catalyst method in a hydrogen reductor column is the most preferred embodiment. The preferred method consists of mixing the uranium (VI) nitrate with zirconium nitrate prior to the reduction step although it is surprising that satisfactory reduction occurs in the presence of the zirconium nitrate. The advantage of this embodiment is that problems involved with undesired oxidation of uranium (IV) nitrate are minimized by having it in the presence of zirconyl nitrate as soon as the uranium is reduced. The zirconyl ions have a stabilizing affect to prevent re-oxidation of the uranium (IV) back to its uranium (VI) valence state.

Reduction of the hexavalent to tetravalent uranium is preferably carried out in a slurry type or batch reactor wherein a platinum catalyst is suspended in a thoroughly mixed uranylzirconyl nitrate solution and hydrogen is introduced through a sparger. The reduction is monitored by measuring redox potential of the solution. At least 60 weight percent, but more preferably from 75 to 100 weight percent, of the uranium (VI) is reduced to the tetravalent state. Most preferably, the reduction is continued until between about 96 and 100 percent of the uranium is in the tetravalent state as indicated by a sharp break in the redox potential of the solution. Optionally, formic acid is added immediately before reduction has begun as a holding reductant.

One suitable reductor column has a six-inch diameter vessel having a 40- to 50-liter capacity and is operated at approximately half of capacity for minimal entrainment of generated gases. This batch-slurry reduction method exhibited excellent reproducibility with respect to chemical compositions and reduction time. The reduced solutions provided consistent feed for sol formation. The feed to the reduction step may be from 0.6 to 1.25 molar in uranium.

The sol is prepared by reducing the nitrate content in the aqueous solution containing uranium (IV) and zirconyl ions to a substoichiometric amount with respect to the metal content by contacting the solution with a primary or secondary amine and thereafter separating the resulting nitrate containing organic phase from the resulting nitrate-depleted aqueous phase in one or more contacting steps. The amine may be any water insoluble amine capable of forming complexes with nitric acid. Primary and secondary amines containing from about 4 to 20 carbon atoms are preferred. Most preferably, the amine contains at least 10 carbon atoms. Lauryl trialkylmethylamine is particularly suitable. The amine is introduced in a suitable diluent such as kerosene. Other suitable amines and diluents are described in Brown et al., U.S. Pat. 2,877,250, issued Mar. 10, 1959. One method of denitration is described by Moore, U.S. Pat. 3,335,095 of Aug. 8, 1967. In one suitable embodiment the nitrate solution is contacted with the amine for about 2 to 10 minutes at about 25 to 50° C., and a subsequent contacting at 55 to 90° C. The denitration is carried substantially to completion in that the denitrated solution contains only 0.06 to 0.2 moles of nitrate per mole of metal.

The sol thus prepared may be concentrated to at least as high as 3.6 M of metal by routine vacuum evaporation methods whereas prior art nitrate sols could only be concentrated to perhaps 2 M metal. This property of concentratability is highly desirable in the sol art.

The strating uranium (VI) nitrate solution is prepared by methods known to those skilled in the art. For example, a convenient starting feed is uranium hexafluoride. This is converted to the nitrate by, for example, hydrolyzing, precipitating with ammonia to produce ammonium diuranate, calcining to drive off ammonia and ammonium fluoride, and thereafter dissolving in nitric acid. Another process involves employing aluminum nitrate in the presence of an organic solvent at a concentration and acidity adjusted to induce separation into organic and aqueous nitrate phases. In water, the uranium (VI) nitrate disassociates to $UO_2^{++}$ and $2NO_3^-$ ions. Zirconyl nitrate is commercially available.

Having thus described my invention, the following examples are offered to illustrate it in more detail, but are not to be considered limiting.

EXAMPLE I

This example illustrates the embodiment wherein the uranium (VI) nitrate is first reduced to uranium (IV) nitrate and then is mixed with zirconyl nitrate. Uranium (VI) nitrate, formic acid, and Adams catalyst consisting of platinum oxide were introduced to a glass container and hydrogen was passed through the solution at 200 cc. per minute and a stirrer speed of 750 r.p.m. The nitrate to $U^{+6}$ molar ratio was 2.6. The formate to $U^{+6}$ molar ratio was 0.5. The platinum to $U^{+6}$ molar ratio was 0.014. The temperature of reduction was 20° C. to start, and gradually raised to 29° C. at the end of the reduction. The reaction was monitored with a platinum and glass reference electrode redox potential monitor and the reaction was stopped at 99 to 100 percent reduction. The beginning $U^{+6}$ concentration was 0.6 molar. The platinum was filtered off and one liter of the resulting solution which was 0.6 molar in $U^{+4}$ was diluted to 0.2 molar $U^{+4}$ by adding an aqueous solution of zirconyl nitrate. Twenty-six grams of a 284 grams/liter zirconyl nitrate solution were necessary. Before dilution the $U^{+4}$ solution was 1.56 molar in nitrate ion, 0.3 molar in formate ion, the nitrate to uranium molar ratio was 2.5, and the formate to uranium molar ratio was 0.5. After dilution, the solution was 0.195 molar in $U^{+4}$, 0.061 molar in $Zr^{+4}$, 0.65 molar in nitrate ion, 0.1 molar in formate ion. The total metal content was 0.26 of metal. This solution was denitrated with LA-2 (Rohm & Haas' brand of lauryl trialkylmethylamine dissolved in kerosene in a concentration of 0.2 molar amine). The nitrate was removed to a molar ratio of 0.35 nitrate to metal by contacting with the LA-2 for 10 minutes at 45° C. Resulting was an amorphous sol. This sol was heated to 75° C. and contacted with 0.1 molar LA-2 for one hour. The organic phase was removed. The aqueous phase was scrubbed with 0.5 volume of a 1:1 diethyl benzene/kerosene mixture per volume of aqueous solution to remove the entrained amine. This resulted in a stable sol which was concentrated with a vacuum rotary evaporator to a metal concentration of 2.3 moles of metal per liter of sol. A sample of this sol was stored for three months with no apparent change in measured properties such as conductance and pH.

EXAMPLE II

This example illustrates the preferred embodiment in which zirconyl nitrate is added to the uranium (VI) nitrate before reduction. 130 grams of a solution of zirconyl nitrate containing 284 grams of zirconium per liter of solution was added to an aqueous solution of uranium (VI) nitrate to result in one liter of solution containing 0.6 molar of U. One liter of the resulting solution was placed in a glass reductor container and formic acid was introduced to achieve a formate to $U^{+6}$ molar ratio of 0.5. This solution was reduced under the same conditions as in the previous example. The platinum catalyst was filtered off, and the resulting solution was diluted with 2 volumes of water per volume of solution. The resulting solution was denitrated under the same conditions as in the previous example and resulted in a stable sol.

It is our theory that this method results in better sol gel microsphere product, shards, pellets or other shapes than the method of Fitch et al. because we believed the urania and zirconia in the resulting sols to be more intimately entrained in each other. That is to say, when the urania and zirconia ions are both in solution together and are formed simultaneously in a sol, the urania and zirconia are entrapped in each other's crystal lattice structure in a manner analogous to coprecipitation. This results in more stable sols, and a high quality final product. Other advantages of this process are ease of make-up, and the scrap being in nitrate form which in a continuous process has advantages in that it is readily recycled. Various improvements, alternatives and modifications should become apparent to those skilled in the art without departing from the spirit and scope of the invention.

We claim:
1. A process for preparing a stable, homogeneous uranium dioxide-zirconium dioxide binary sol comprising:
   (A) Denitrating an aqueous solution containing zirconyl nitrate, uranium (IV) nitrate, and uranium (VI) nitrate wherein at least about 60 weight percent of the uranium is in the tetravalent form by contacting said solution with a primary or secondary amine so as to form a stable, homogeneous uranium dioxide-zirconium dioxide binary sol.
2. The process of claim 1 comprising:
   (A) Mixing an aqueous solution containing

$UO_2(NO_3)_2$ with an aqueous solution containing $ZrO(NO_3)_2$,
   (B) Contacting the resultant mixture with a reducing gas in the presence of a catalyst insoluble in nitric acid to reduce at least about 60 weight percent of the uranium (VI) to uranium (IV),
   (C) Thereafter denitrating the reduced mixture.
3. The process of claim 1 comprising:
   (A) Contacting an aqueous solution of $UO_2(NO_3)_2$ with a reducing gas in the presence of a catalyst insoluble in nitric acid to reduce at least about 60 weight percent of the uranium (VI) to uranium (IV),
   (B) mixing the resultant aqueous solution with an aqueous solution containing zirconyl nitrate,
   (C) thereafter denitrating the resultant solution with a primary or secondary amine.

4. The process of claim 2 wherein the reducing gas in step (B) is hydrogen and the catalyst is selected from the group consisting of platinum, rhodium, iridium, platinum alloys and palladium alloys.

5. The process of claim 2 wherein from about 75 weight percent to about 100 weight percent of the uranium (VI) is reduced to uranium (IV) in step (B).

6. The process of claim 1 wherein the amine is of the formula $RR_1NH$ wherein R and $R_1$ are saturated or unsaturated, substituted or unsubstituted, hydrocarbon radicals containing from about 4 to about 20 carbon atoms and wherein $R_1$ may alternatively be hydrogen.

7. The method of claim 1 wherein said solution is contacted with the amine for from about 2 minutes to about 10 minutes at a temperature of from about 25° C. to about 50° C.

8. The method of claim 7 wherein the nitrate is extracted in a subsequent contacting with amine at a temperature of 55° to 90° C.

9. The process of claim 8 wherein the mixture after denitration contains traces of nitrate on a molar ratio of nitrate to metal of from about 0.06 to about 0.2.

10. The process of claim 3 wherein said reducing gas is hydrogen and the catalyst is selected from the group consisting of platinum, rhodium, iridium, platinum alloys and palladium alloys.

References Cited
UNITED STATES PATENTS

| | | | |
|---|---|---|---|
| 3,186,949 | 6/1965 | Fitch et al. | 252—301.1 |
| 3,401,122 | 9/1968 | Cogliati et al. | 252—301.1 |
| 3,367,881 | 2/1968 | Morse | 252—301.1 |
| 3,335,095 | 1/1967 | Moore | 252—301.1 |
| 3,256,204 | 6/1966 | O'Connor | 252—301.1 |
| 3,312,633 | 4/1967 | Smith | 252—301.1 |
| 3,312,628 | 4/1967 | Smith | 252—301.1 |
| 3,265,626 | 8/1966 | Fitch et al. | 252—301.1 |
| 3,150,100 | 9/1964 | Fitch et al. | 252—301.1 |

CARL D. QUARFORTH, Primary Examiner

R. L. TATE, Assistant Examiner